(12) United States Patent
Noda

(10) Patent No.: US 7,085,077 B1
(45) Date of Patent: Aug. 1, 2006

(54) IMAGE LENS ARRAY

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/247,913

(22) Filed: Oct. 11, 2005

(51) Int. Cl.
*G02B 9/12* (2006.01)

(52) U.S. Cl. ...................................... 359/784; 359/792
(58) Field of Classification Search ................ 359/784, 359/792, 689, 786, 780, 772, 686, 716, 776, 359/771
See application file for complete search history.

(56) References Cited

U.S. PATENT DOCUMENTS 6,643,072 B1 * 11/2003 Mihara ..................... 359/686

* cited by examiner

*Primary Examiner*—Timothy Thompson
(74) *Attorney, Agent, or Firm*—Charles E. Baxley

(57) ABSTRACT

An image lens array, from object side, comprises a first lens, an aperture, a second lens and a third lens. The first lens is a positive meniscus lens with a convex surface facing the object side; the second lens is positive meniscus lens with a convex surface facing the image side; the third lens is a positive meniscus lens with a convex surface facing the object side; and the first lens, the second lens and the third lens are made of the same plastic material, a focal length of the image lens array is f, a combined focal length of the first and second lenses is f12, a relation between the f and f12 can satisfy the equation: $1.0<f12/f<1.3$.

1 Claim, 14 Drawing Sheets

(1st embodiment) focal length f=4.194  F NO=2.8  angle of view 2ω=71.5°

| seq no of the Surfaces of lenses | radius of curvature | thickness | refracting power | degree |
|---|---|---|---|---|
| 1 | 1.523 | | | |
| | | 0.51 | 1.5251 | 56.3 |
| 2 | 3.482 | | | |
| | | 0.18 | | |
| 3 | ∞ | | | |
| | | 0.88 | | |
| 4 | −0.764 | | | |
| | | 0.44 | 1.5251 | 56.3 |
| 5 | −0.880 | | | |
| | | 0.08 | | |
| 6 | 4.858 | | | |
| | | 1.62 | 1.5251 | 56.3 |
| 7 | 7.058 | | | |
| | | 0.98 | | |
| 8 | ∞ | | | |
| | | 0.50 | 1.51680 | 64.2 |
| 9 | ∞ | | | |
| | | 0.42 | | |
| 10 | image plane | | | |

| aspherical lens | K | A | B | C | D |
|---|---|---|---|---|---|
| 1 | 0.484 | 1.140E-02 | −4.400E-04 | −1.718E-02 | 6.537E-02 |
| 2 | 9.196 | −1.694E-02 | 1.114E-01 | 3.031E-01 | 3.949E-01 |
| 4 | −0.510 | −3.840E-02 | −1.117E-01 | 4.053E-01 | −4.065E-01 |
| 5 | −0.500 | 6.944E-03 | −1.934E-02 | 8.743E-02 | −5.156E-02 |
| 6 | −30.684 | −8.716E-03 | 2.798E-03 | −1.910E-04 | −2.908E-05 |
| 7 | −15.359 | −3.921E-02 | 1.087E-02 | −2.627E-03 | 3.393E-04 | spherical aberration astigmatic difference the distortion aberration (2nd embodiment) focal length f=4.153  F NO=2.8  angle of view 2ω=71.0°

| seq no of the Surfaces of lenses | radius of curvature | thickness | refracting power | degree |
|---|---|---|---|---|
| 1 | 1.473 | | | |
| | | 0.60 | 1.5251 | 56.3 |
| 2 | 3.237 | | | |
| | | 0.18 | | |
| 3 | ∞ | | | |
| | | 0.88 | | |
| 4 | −0.794 | | | |
| | | 0.53 | 1.5251 | 56.3 |
| 5 | −0.911 | | | |
| | | 0.08 | | |
| 6 | 4.858 | | | |
| | | 1.06 | 1.5251 | 56.3 |
| 7 | 7.058 | | | |
| | | 1.26 | | |
| 8 | ∞ | | | |
| | | 0.50 | 1.51680 | 64.2 |
| 9 | ∞ | | | |
| | | 0.42 | | |
| 10 | image plane | | | |

| aspherical lens | K | A | B | C | D |
|---|---|---|---|---|---|
| 1 | 0.438 | 5.365E−03 | 1.961E−03 | −1.626E−02 | 6.329E−02 |
| 2 | 9.384 | −1.386E−02 | 1.023E−01 | −3.029E−01 | 4.061E−01 |
| 4 | −0.499 | −4.528E−02 | −1.109E−01 | 4.007E−01 | −4.031E−01 |
| 5 | −0.508 | 2.062E−02 | −2.409E−02 | 8.564E−02 | −5.235E−02 |
| 6 | −43.602 | −8.661E−03 | 2.674E−03 | −2.212E−04 | −3.379E−05 |
| 7 | −85.423 | −4.170E−02 | 1.088E−02 | −2.660E−03 | 3.360E−04 | spherical aberration        astigmatic difference        the distortion aberration (3rd embodiment) focal length f=4.267  F NO=2.8  angle of view 2ω=62.7°

| seq no of the Surfaces of lenses | radius of curvature | thickness | refracting power | degree |
|---|---|---|---|---|
| 1 | 1.954 | | | |
| | | 0.79 | 1.5251 | 56.3 |
| 2 | 8.114 | | | |
| | | 0.35 | | |
| 3 | ∞ | | | |
| | | 0.90 | | |
| 4 | −0.833 | | | |
| | | 0.72 | 1.5251 | 56.3 |
| 5 | −0.960 | | | |
| | | 0.04 | | |
| 6 | 2.722 | | | |
| | | 0.89 | 1.5251 | 56.3 |
| 7 | 2.495 | | | |
| | | 1.10 | | |
| 8 | ∞ | | | |
| | | 0.70 | 1.51680 | 64.2 |
| 9 | ∞ | | | |
| | | 0.40 | | |
| 10 | image plane | | | |

| aspherical lens | K | A | B | C | D |
|---|---|---|---|---|---|
| 1 | 0.085 | −3.345E−03 | 8.788E−03 | −1.506E−02 | 1.203E−03 |
| 2 | −4.749 | −1.506E−02 | 5.800E−02 | −1.933E−01 | 3.210E−01 |
| 4 | −0.920 | 1.788E−02 | −3.215E−01 | 1.008E−00 | −1.348E−00 |
| 5 | −0.525 | 8.059E−02 | −3.239E−02 | 8.708E−02 | −3.121E−02 |
| 6 | −14.063 | −3.256E−03 | 2.584E−03 | −6.925E−05 | −2.432E−04 |
| 7 | −18.309 | −4.581E−02 | 1.311E−02 | −2.711E−03 | 2.508E−04 | spherical aberration   astigmatic difference   the distortion aberration (4th embodiment) focal length f=4.188  F NO=2.8  angle of view 2ω=70.7°

| seq no of the Surfaces of lenses | radius of curvature | thickness | refracting power | degree |
|---|---|---|---|---|
| 1 | 1.611 | | | |
| | | 0.80 | 1.5251 | 56.3 |
| 2 | 3.770 | | | |
| | | 0.18 | | |
| 3 | ∞ | | | |
| | | 0.82 | | |
| 4 | −0.866 | | | |
| | | 0.71 | 1.5251 | 56.3 |
| 5 | −0.943 | | | |
| | | 0.03 | | |
| 6 | 6.319 | | | |
| | | 1.14 | 1.5251 | 56.3 |
| 7 | 6.126 | | | |
| | | 1.24 | | |
| 8 | ∞ | | | |
| | | 0.50 | 1.51680 | 64.2 |
| 9 | ∞ | | | |
| | | 0.42 | | |
| 10 | image plane | | | |

| aspherical lens | K | A | B | C | D |
|---|---|---|---|---|---|
| 1 | 0.551 | 8.315E-03 | 1.368E-02 | −4.208E-02 | 3.395E-03 |
| 2 | 5.245 | −3.442E-02 | 1.541E-01 | 3.834E-01 | 3.975E-01 |
| 4 | −0.460 | −1.321E-01 | −9.091E-02 | 1.259E-01 | −1.008E-01 |
| 5 | −0.474 | −5.584E-03 | 1.613E-02 | 3.757E-02 | −3.813E-02 |
| 6 | −181.310 | 3.477E-03 | −4.483E-04 | −1.224E-04 | 2.918E-06 |
| 7 | −88.825 | 4.559E-02 | 1.113E-02 | −2.410E-03 | 2.839E-04 | spherical aberration   astigmatic difference   the distortion aberration (5th embodiment) focal length f=4.119  F NO=2.8  angle of view 2ω=70.2°

| seq no of the Surfaces of lenses | radius of curvature | thickness | refracting power | degree |
|---|---|---|---|---|
| 1 | 1.447 | | | |
| | | 0.61 | 1.5251 | 56.3 |
| 2 | 3.215 | | | |
| | | 0.18 | | |
| 3 | ∞ | | | |
| | | 0.88 | | |
| 4 | −0.812 | | | |
| | | 0.61 | 1.5251 | 56.3 |
| 5 | −0.891 | | | |
| | | 0.08 | | |
| 6 | 5.644 | | | |
| | | 0.85 | 1.5251 | 56.3 |
| 7 | 5.428 | | | |
| | | 1.31 | | |
| 8 | ∞ | | | |
| | | 0.50 | 1.51680 | 64.2 |
| 9 | ∞ | | | |
| | | 0.42 | | |
| 10 | image plane | | | |

| aspherical lens | K | A | B | C | D |
|---|---|---|---|---|---|
| 1 | 0.421 | 2.721E−03 | 3.081E−03 | −1.417E−02 | 6.384E−02 |
| 2 | 9.654 | −1.071E−02 | 9.811E−02 | 3.144E−01 | 4.044E−01 |
| 4 | −0.445 | 8.142E−02 | −1.184E−01 | 4.198E−01 | −3.773E−01 |
| 5 | −0.513 | 3.210E−02 | −2.616E−02 | 8.185E−02 | −5.434E−02 |
| 6 | −51.938 | −6.999E−03 | 2.839E−03 | −1.964E−04 | −2.937E−05 |
| 7 | −74.352 | −4.225E−02 | 1.119E−02 | −2.617E−03 | 3.401E−04 | spherical aberration astigmatic difference the distortion aberration (6th embodiment) focal length f=4.153  F NO=2.8  angle of view 2ω=71.0°

| seq no of the Surfaces of lenses | radius of curvature | thickness | refracting power | degree |
|---|---|---|---|---|
| 1 | 1.473 | | | |
| | | 0.60 | 1.5251 | 56.3 |
| 2 | 3.237 | | | |
| | | 0.18 | | |
| 3 | ∞ | | | |
| | | 0.88 | | |
| 4 | −0.794 | | | |
| | | 0.53 | 1.5251 | 56.3 |
| 5 | −0.911 | | | |
| | | 0.08 | | |
| 6 | 4.858 | | | |
| | | 1.06 | 1.5251 | 56.3 |
| 7 | 7.058 | | | |
| | | 1.26 | | |
| 8 | ∞ | | | |
| | | 0.50 | 1.51680 | 64.2 |
| 9 | ∞ | | | |
| | | 0.42 | | |
| 10 | image plane | | | | aspherical lens

| | K | A | B | C | D |
|---|---|---|---|---|---|
| 1 | 0.438 | 5.365E−03 | 1.961E−03 | −1.626E−02 | 6.329E−02 |
| 2 | 9.384 | −1.386E−02 | 1.023E−01 | −3.029E−01 | 4.061E−01 |
| 4 | −0.499 | −4.528E−02 | −1.108E−01 | 4.007E−0 | −3.773E−01 |
| 5 | −0.508 | 3.210E−02 | −2.616E−02 | 8.564E−02 | −5.235E−02 |
| 6 | −43.602 | −8.661E−03 | 2.674E−03 | −2.212E−04 | −3.379E−05 |
| 7 | −85.423 | −4.170E−02 | 1.088E−02 | −2.660E−03 | 3.360E−04 | spherical aberration astigmatic difference the distortion aberration (7th embodiment) focal length f=4.049  F NO=2.8  angle of view 2ω=70.6°

| seq no of the Surfaces of lenses | radius of curvature | thickness | refracting power | degree |
|---|---|---|---|---|
| 1 | 1.446 | | | |
| | | 0.61 | 1.5251 | 56.3 |
| 2 | 3.222 | | | |
| | | 0.18 | | |
| 3 | ∞ | | | |
| | | 0.88 | | |
| 4 | −0.815 | | | |
| | | 0.62 | 1.5251 | 56.3 |
| 5 | −0.888 | | | |
| | | 0.08 | | |
| 6 | 5.644 | | | |
| | | 0.83 | 1.5251 | 56.3 |
| 7 | 5.547 | | | |
| | | 1.29 | | |
| 8 | ∞ | | | |
| | | 0.50 | 1.51680 | 64.2 |
| 9 | ∞ | | | |
| | | 0.42 | | |
| 10 | image plane | | | | aspherical lens

| | K | A | B | C | D |
|---|---|---|---|---|---|
| 1 | 0.428 | 3.047E-03 | 4.440E-03 | −1.268E-02 | 6.496E-02 |
| 2 | 9.825 | −9.639E-03 | 1.008E-01 | −3.079E-01 | 4.166E-01 |
| 4 | −0.439 | −8.490E-02 | −1.194E-01 | 4.197E-01 | −3.752E-01 |
| 5 | −0.513 | 3.230E-02 | −2.715E-02 | 8.154E-02 | −5.426E-02 |
| 6 | −48.722 | −7.084E-03 | 2.822E-03 | −1.984E-04 | −2.959E-05 |
| 7 | −77.471 | −4.275E-02 | 1.121E-02 | −2.614E-03 | 3.404E-04 | spherical aberration astigmatic difference the distortion aberration

IMAGE LENS ARRAY

BACKGROUND OF THE INVENTION

1. Field of the Invention

The present invention relates to an image lens array for a small image taking device, and more particularly to an imaging lens array consisted of three lenses that are arranged at predetermined intervals.

2. Description of the Prior Arts

An image lens array consisted of 3 lens normally can be arranged in 8 different manners to get different refracting powers, such as: A, positive/negative/positive B, positive/positive/negative C, positive/positive/positive D, positive/negative/negative E, negative/positive/positive F, negative/positive/negative G, negative/negative/positive H, negative/negative/negative. Among the above arrangements, the back focal length of the negative refracting power type lens arrays, normally E, F, G and H, are too long to minimize the whole dimension of the lens array, and it is unsuitable for small handy image taking device. Therefore, the arrangements A–D are virtually the mainstream due to facilitating minimization of the dimension of the lens array. In the prior arts, with reference to table 2, wherein the capital G represents glass lens, while P indicates plastic lens.

Column A shows 12 Japan patents, most arrangements of the first ten patents are consisted of three plastic lenses in consideration of cost, however, the telescope ratio (the ratio of the focal length to the entire optical length of these patents) is greater than 1.5, they are also unsuitable for use on the imaging taking device of the cell phone. Besides, although the conditions and requirements of incident angle of the prefix aperture are easily satisfied, its disadvantages are eccentricity and optical performance weakening of the second lens. In practical production, the refracting power of these lens arrays is difficult to be arranged.

The Japan patent No 11 in the column A is also a three plastic lenses array but with mid aperture, although mid aperture can improve the eccentricity-induced poor optical performance, the telescope ratio will be as high as 2.5.

The Japan patent No 12 in the column A is also a mid aperture type three plastic lenses array whose telescope ratio is 1.24. However, it will become dark when Fno is set at 3.5, and in practical use, it is unable to provide enough brightness. Furthermore, the small telescope ratio of will increase the incident angle up to 25 degree, so it will not be suitable for matching with CCD lens (charge coupled device).

The lens arrays as disclosed by the Japan patents in column B have a small telescope ratio, however, when the telescope ratio is too small, the back focal length will become too short, so that the lens array can't spare enough spaces for insertion of infrared filter or CCD protective glass.

Telescope ratio of the lens arrays disclosed in Japan patents No 1–3 or 6–10 stated in the column B is over 1.4, it is not handy and small enough, and the minimum telescope ratio is approximately 1.2–1.4 after insertion of the infrared filter or CCD lens.

Japan patents No 4, 5 and 11 in the column B are a three plastic lenses array, the lens array is maintained at small size when their telescope ratio is 1.2–14. f12/f<1.0 (f12 represents the combined focal length of the first and second lenses, f is the focal length of the entire lens array). As compared with the devices of the columns A, C and D, the refracting power of the second lens of column B is excessively strong, consequently, the peripheral thickness of the lens is difficult to be controlled, and eccentricity is likely to be caused during process of lens forming or assembling. The astigmatic difference of the patents nearby the middle portion of column B become large, so that, in mass production, the eccentricity of the off-axis Meridional image of the patents nearby the middle portion of column B will lead to a poor performance.

The first lens of whichever Japan Patents in column C is made of low dispersion high price glass used on tape-type image taking device, its high price is a problem, and the length of the image lens array is determined by the telescope ratio ranging from 1.4 to 1.7. Therefore, it doesn't facilitate minimization of the size of the lens array. Furthermore, the patents in column C don't have any prefix aperture type lens array.

Some lens arrays disclosed in Japan Patents in column D have the same refracting power as column A and its telescope ratio is as large as 1.54, Therefore, it doesn't facilitate minimization of the size of the lens array. Furthermore, the patents in column D don't have any prefix aperture type lens array.

Among the above-mentioned image lens arrays, the arrangement as stated in column A is commonly used, but its telescope ratio is over 1.4 and is not suitable for shortening the entire optical length. Columns B and D are more suitable shortening the entire optical length. The telescopic lens assembly normally comprises 2–3 lens and is used on image-taking lens array of silver salt camera. Since back group has negative refracting power and is difficult to be wide angled, it is unsuitable for use on the optical system whose back lens group needs to be wide-angled. Furthermore, CCD lens can not be used on the above-mentioned image-taking lens assembly due to incident angle problem.

The lens arrangements E–H are reversed telescopic lens array whose first lens has a negative refracting power, and two-lens formed VGA (video graphic array) only can be used on the 0.3–0.4 Mega pixel level digital camera and is unsuitable for use for reversed focusing and reducing the entire optical length. Therefore, lens array consisted of more than 3 lenses is not used on simply structured digital camera.

The present invention has arisen to mitigate and/or obviate the afore-described disadvantages.

SUMMARY OF THE INVENTION

The primary objective of the present invention is to provide a low cost image lens array consisted of three plastic lenses.

The secondary objective of the present invention is to provide an image lens array, a focal length of the image lens array is f, a combined focal length of the first and second lenses is f12, a relation between the f and f12 can satisfy the equation: $1.0 < f12/f < 1.3$. The image lens array is light and handy, and has an optimized refracting power, and the optical length of the image lens array is relatively short but is still enough to provide an enough space for accommodation of the infrared filter glass and the image lens protector.

An image lens array, from object side to image side, comprises a first lens, an aperture, a second lens and a third lens; and wherein the first lens is a positive meniscus lens with positive refractive power and has a convex surface facing the object side; the aperture is located behind the first lens; the second lens is positive meniscus lens with positive refractive power and has a convex surface facing the image side; the third lens is a positive meniscus lens with positive refractive power and has a convex surface facing the object side; and the first lens, the second lens and the third lens are made of the same plastic material, a focal length of the image lens array is f, a combined focal length of the first and second lenses is f12, a relation between the f and f12 can satisfy the equation: 1.0<f12/f<1.3.

When the focal length of the image lens array is f, a focal-length of the third lens is f3, and then f and f3 can satisfy the equation: f/f3>5.0.

If the image lens array as claimed in claim 1, wherein the focal length of the image lens array is f, a focal length of the second lens is f2, and then f and f2 can satisfy the equation: 2.0<f2<f<11.0.

The present invention will become more obvious from the following description when taken in connection with the accompanying drawings, which show, for purpose of illustrations only, the preferred embodiments in accordance with the present invention.

Table 1 shows the data of the respective embodiments of the present invention;

Table 2 shows the data of the prior art.

DETAILED DESCRIPTION OF THE PREFERRED EMBODIMENTS

Figure 1A:
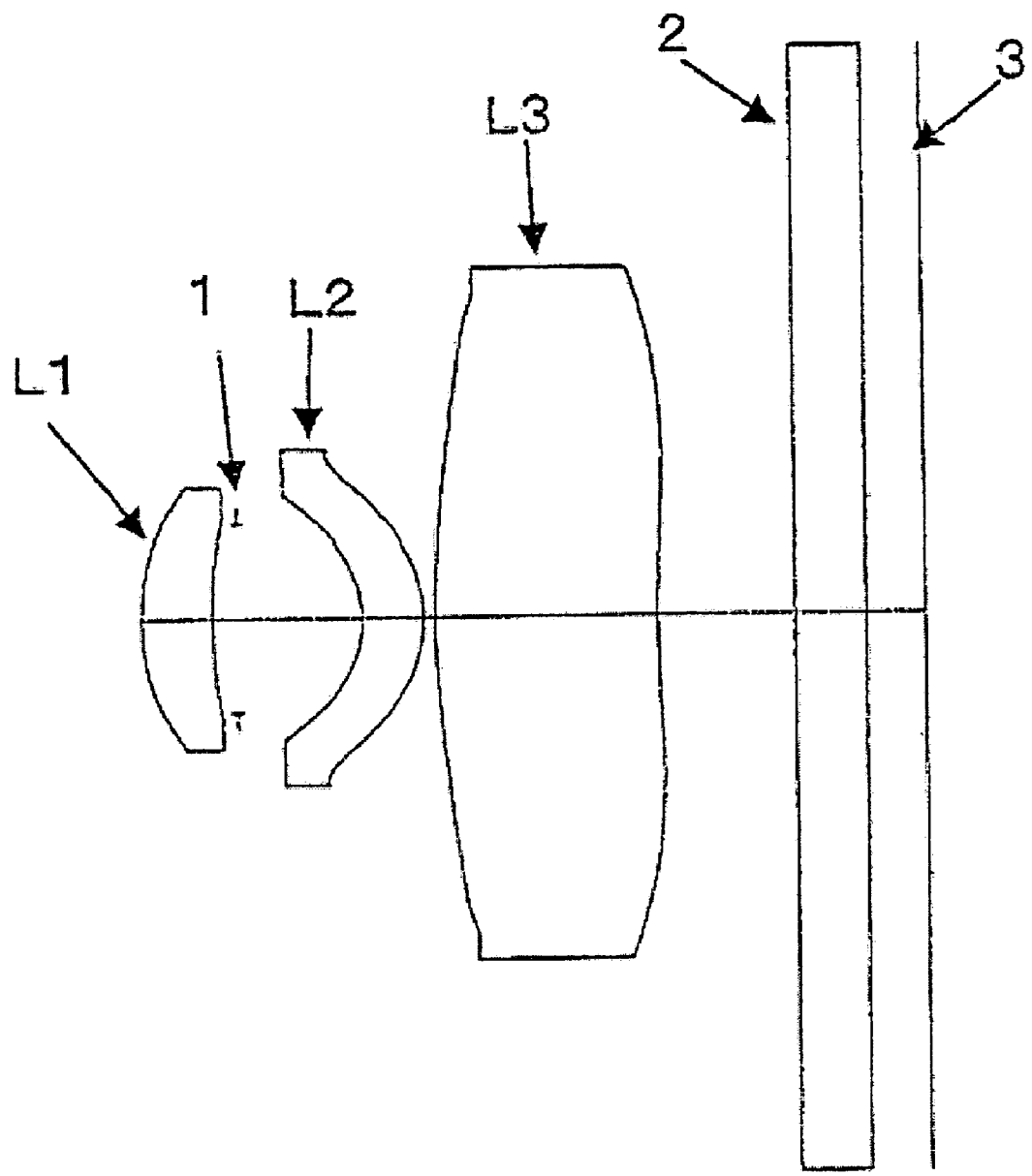
FIG. 1a shows an image lens array in accordance with a first embodiment of the present invention.
Figure 1B:
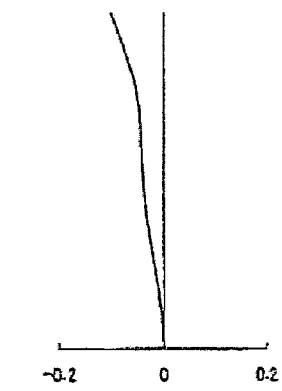
FIG. 1b shows the real numerical values of the respective lens of the first embodiment.
Figure 1B:
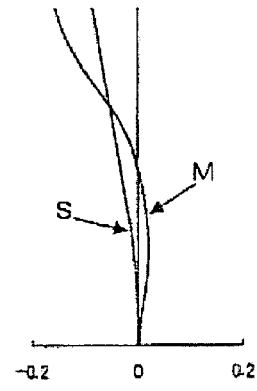
Figure 1B:
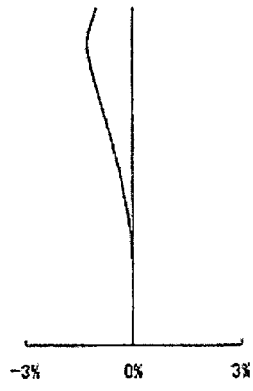
Figure 2A:
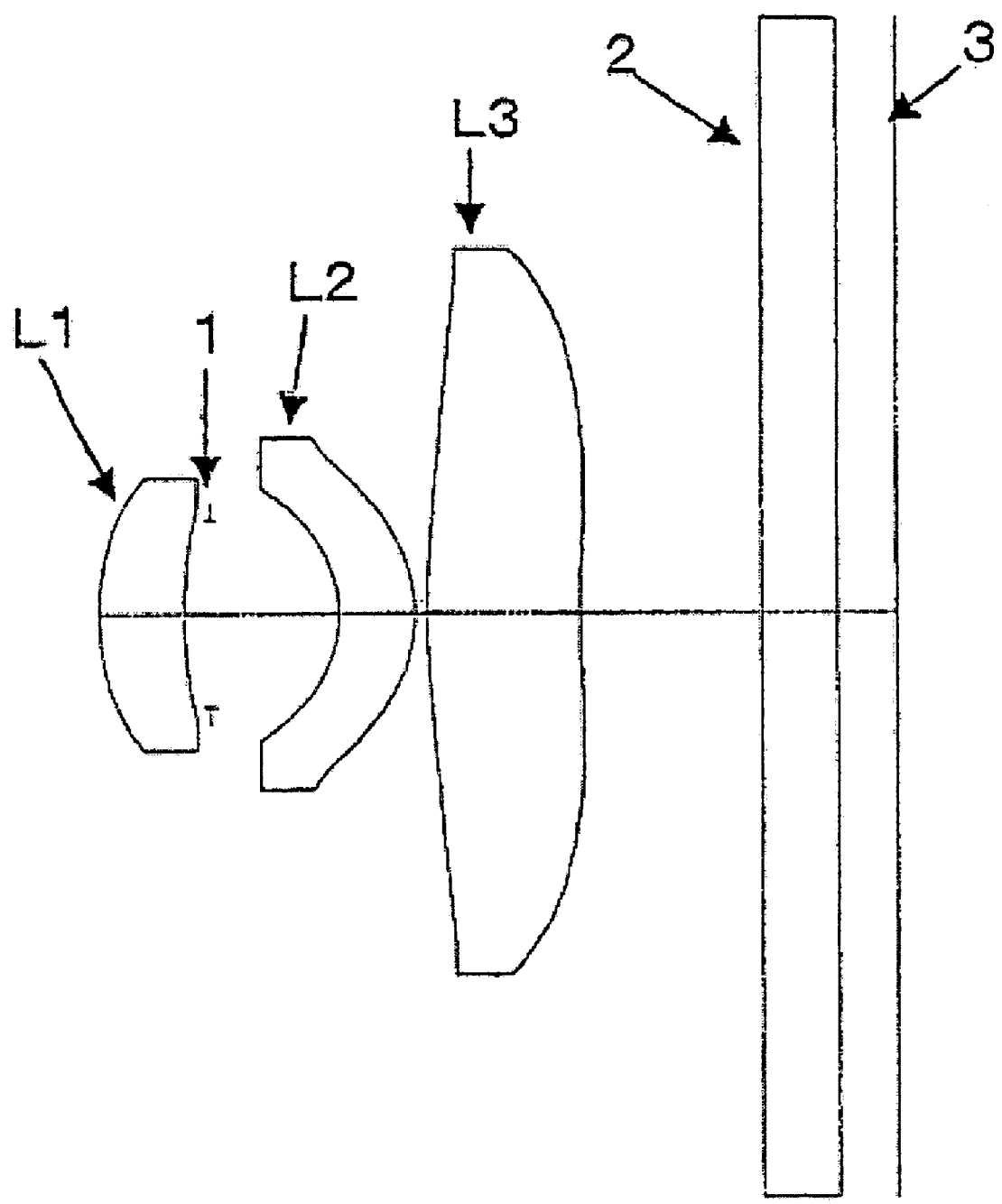
FIG. 2a shows an image lens array in accordance with a second embodiment of the present invention.
Figure 2B:
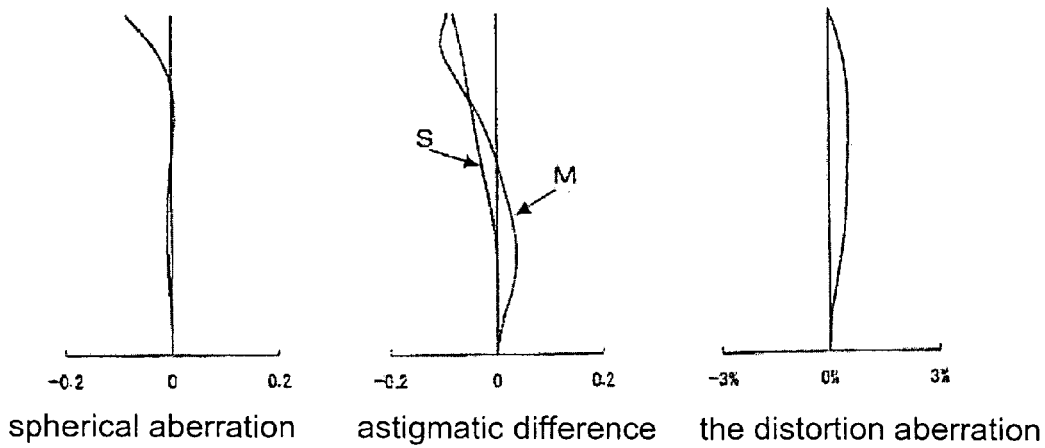
FIG. 2b shows the real numerical values of the respective lens of the second embodiment.
Figure 3A:
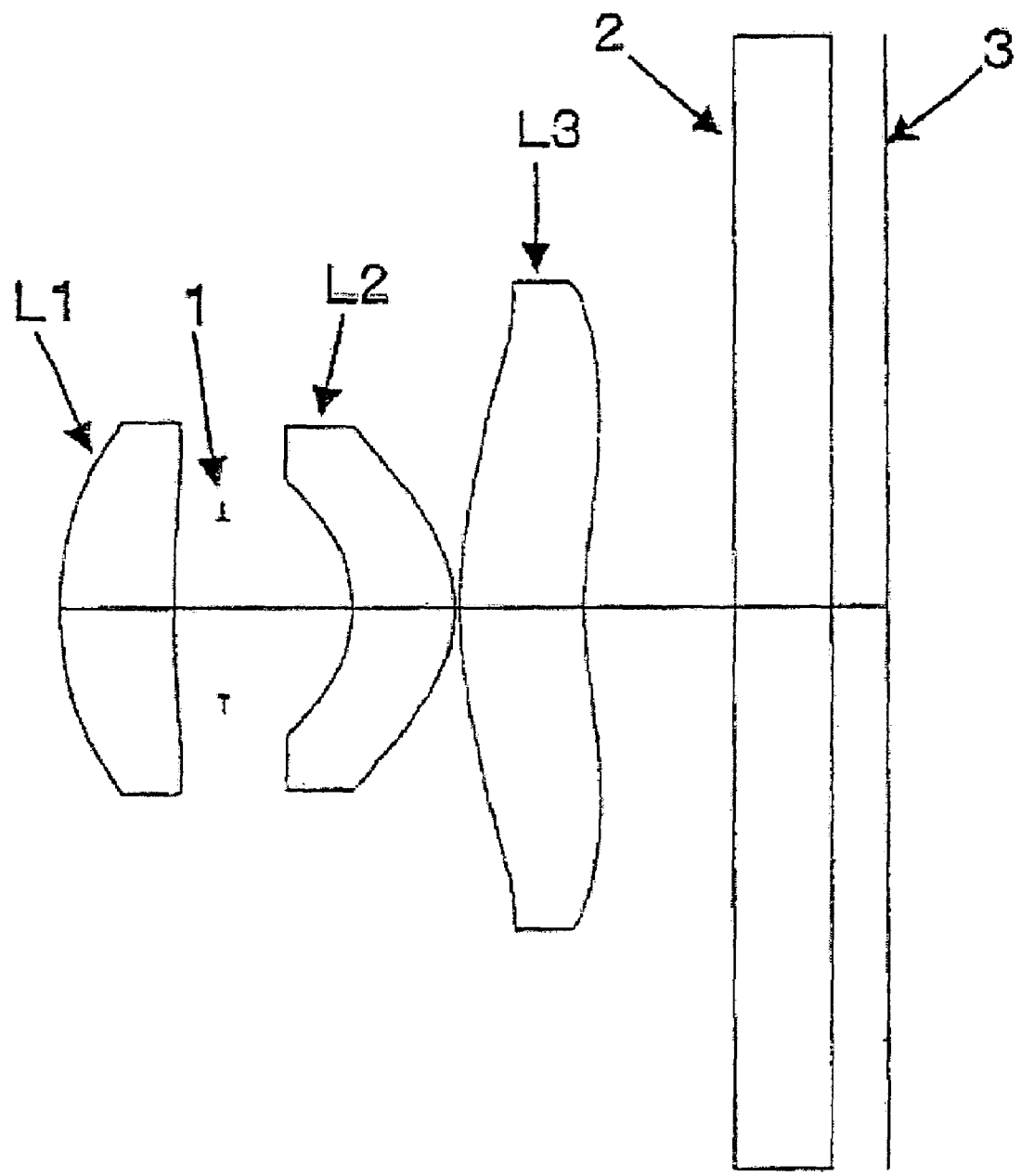
FIG. 3a shows an image lens array in accordance with a third embodiment of the present invention.
Figure 3B:
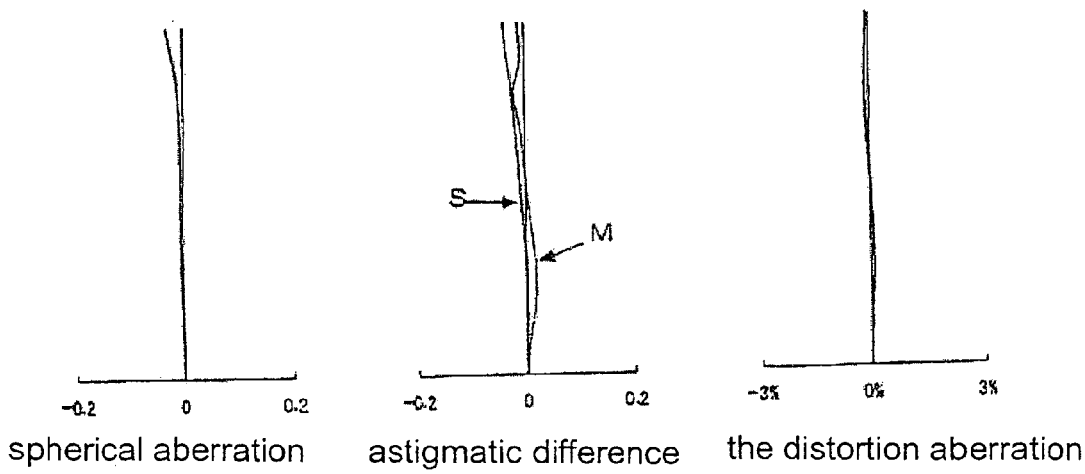
FIG. 3b shows the real numerical values of the respective lens of the third embodiment.
Figure 4A:
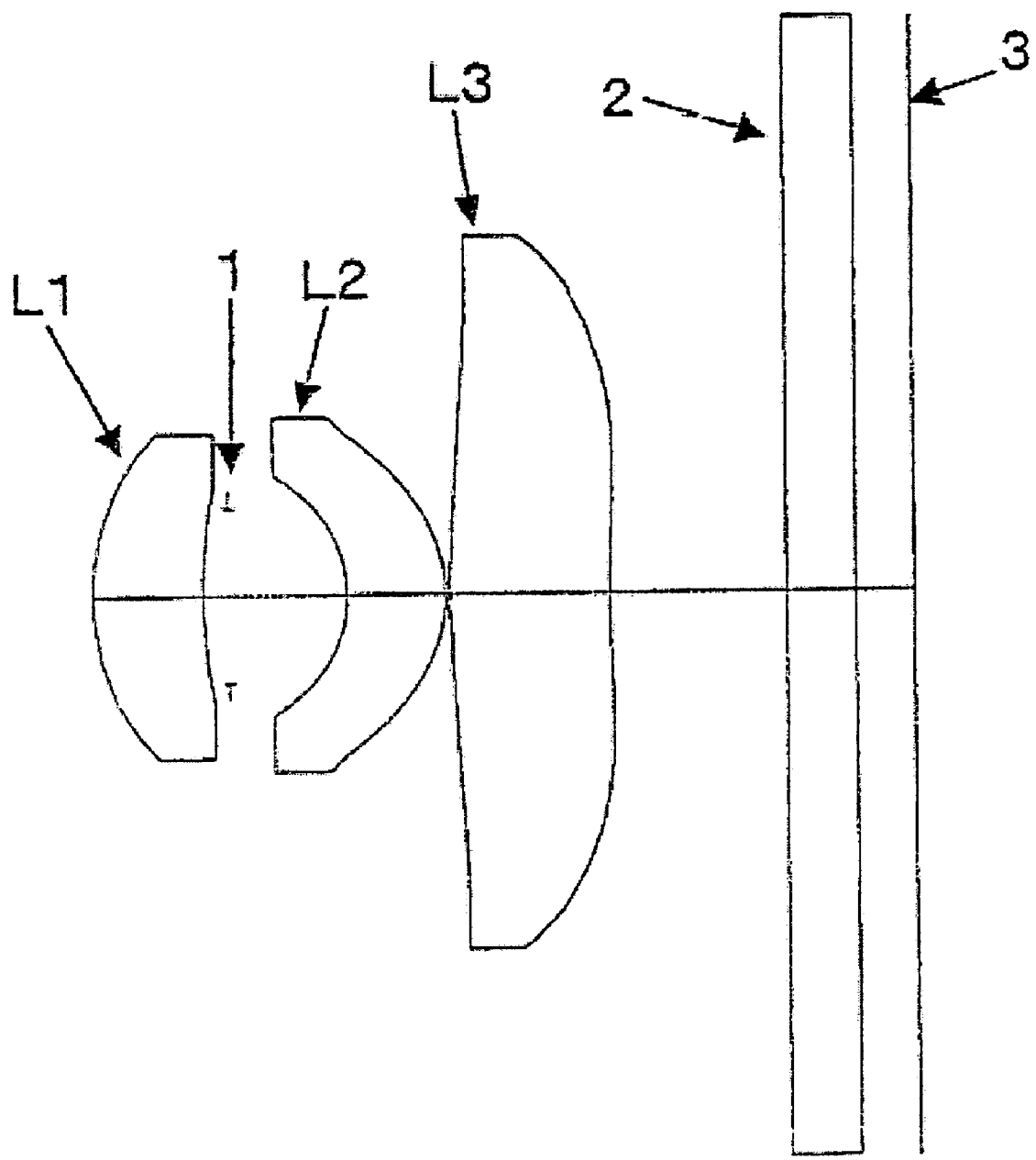
FIG. 4a shows an image lens array in accordance with a fourth embodiment of the present invention.
Figure 4B:
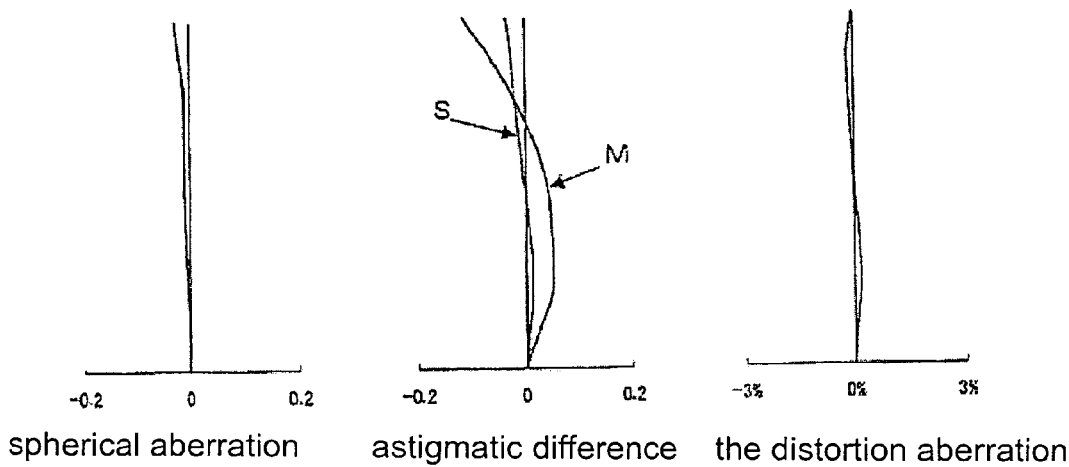
FIG. 4b shows the real numerical values of the respective lens of the fourth embodiment.
Figure 5A:
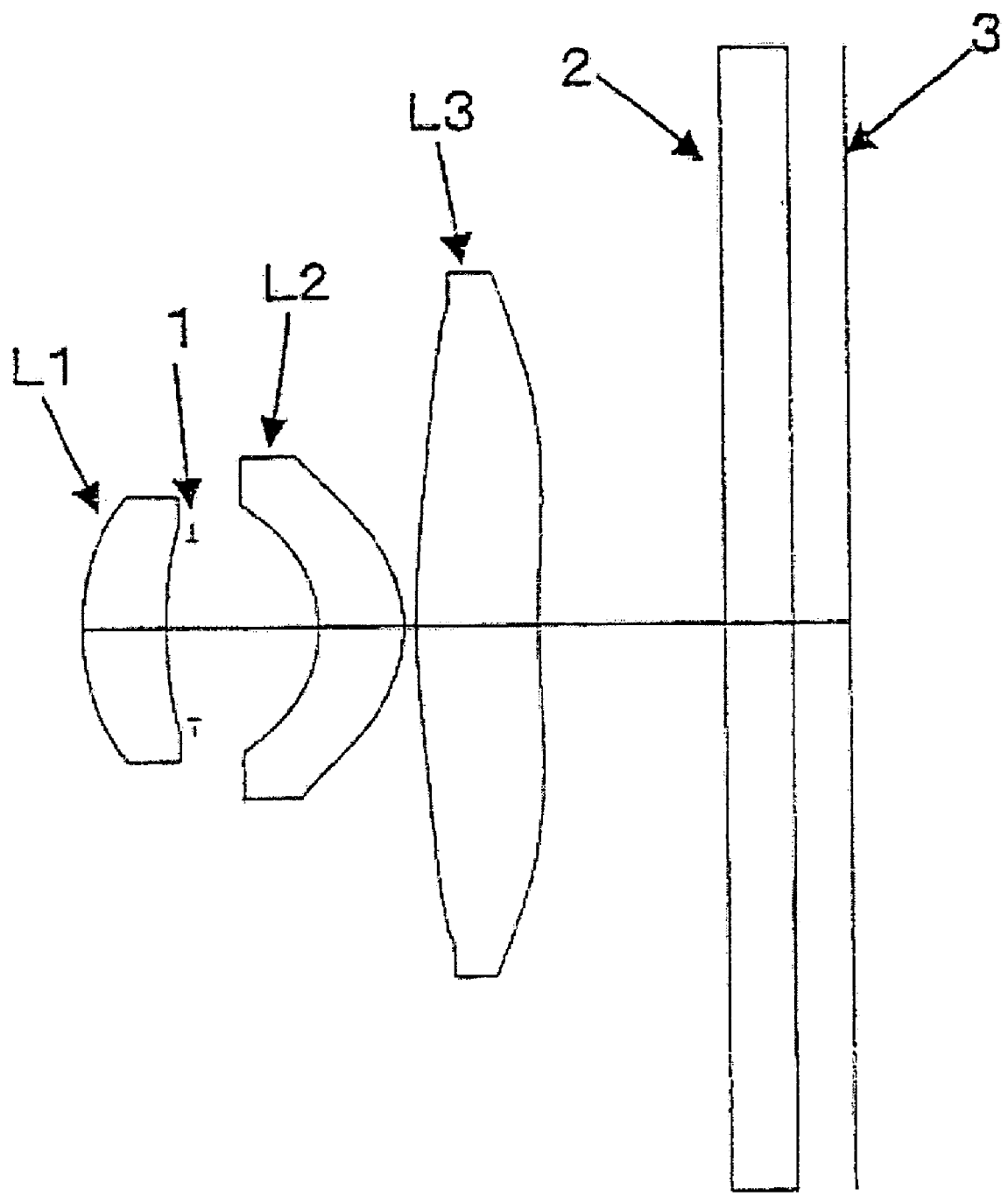
FIG. 5a shows an image lens array in accordance with a fifth embodiment of the present invention.
Figure 5B:
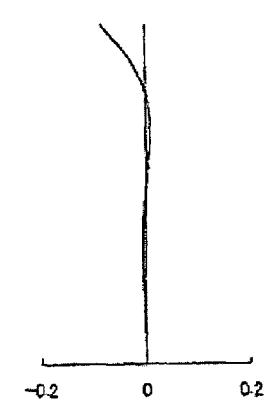
FIG. 5b shows the real numerical values of the respective lens of the fifth embodiment.
Figure 5B:
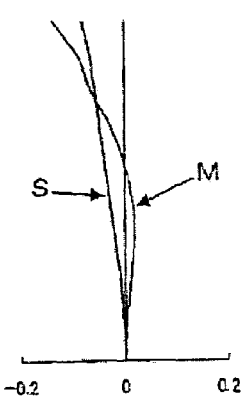
Figure 5B:
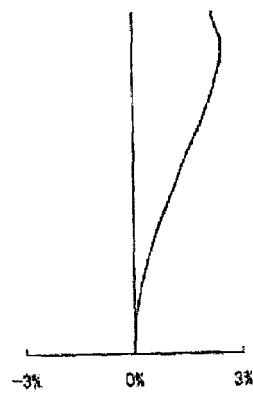
Figure 6A:
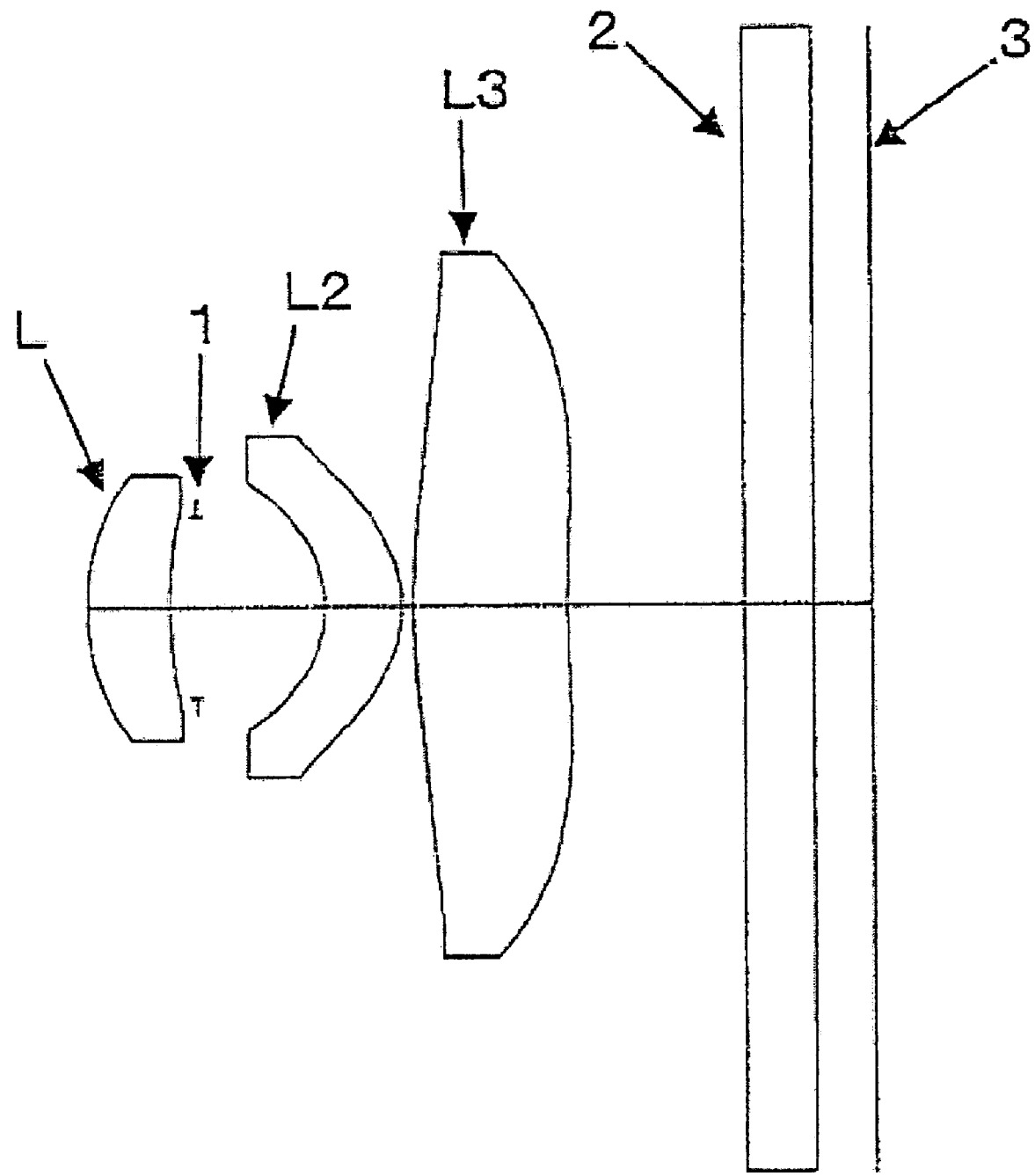
FIG. 6a shows an image lens array in accordance with a sixth embodiment of the present invention.
Figure 6B:
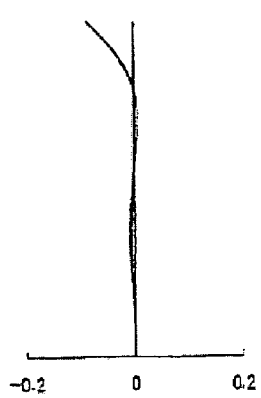
FIG. 6b shows the real numerical values of the respective lens of the sixth embodiment.
Figure 6B:
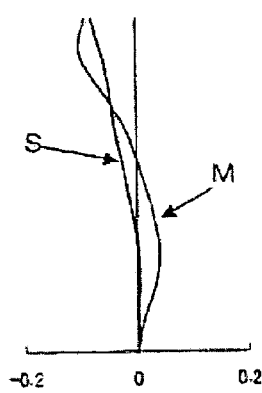
Figure 6B:
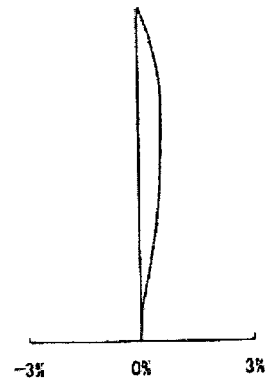
Figure 7A:
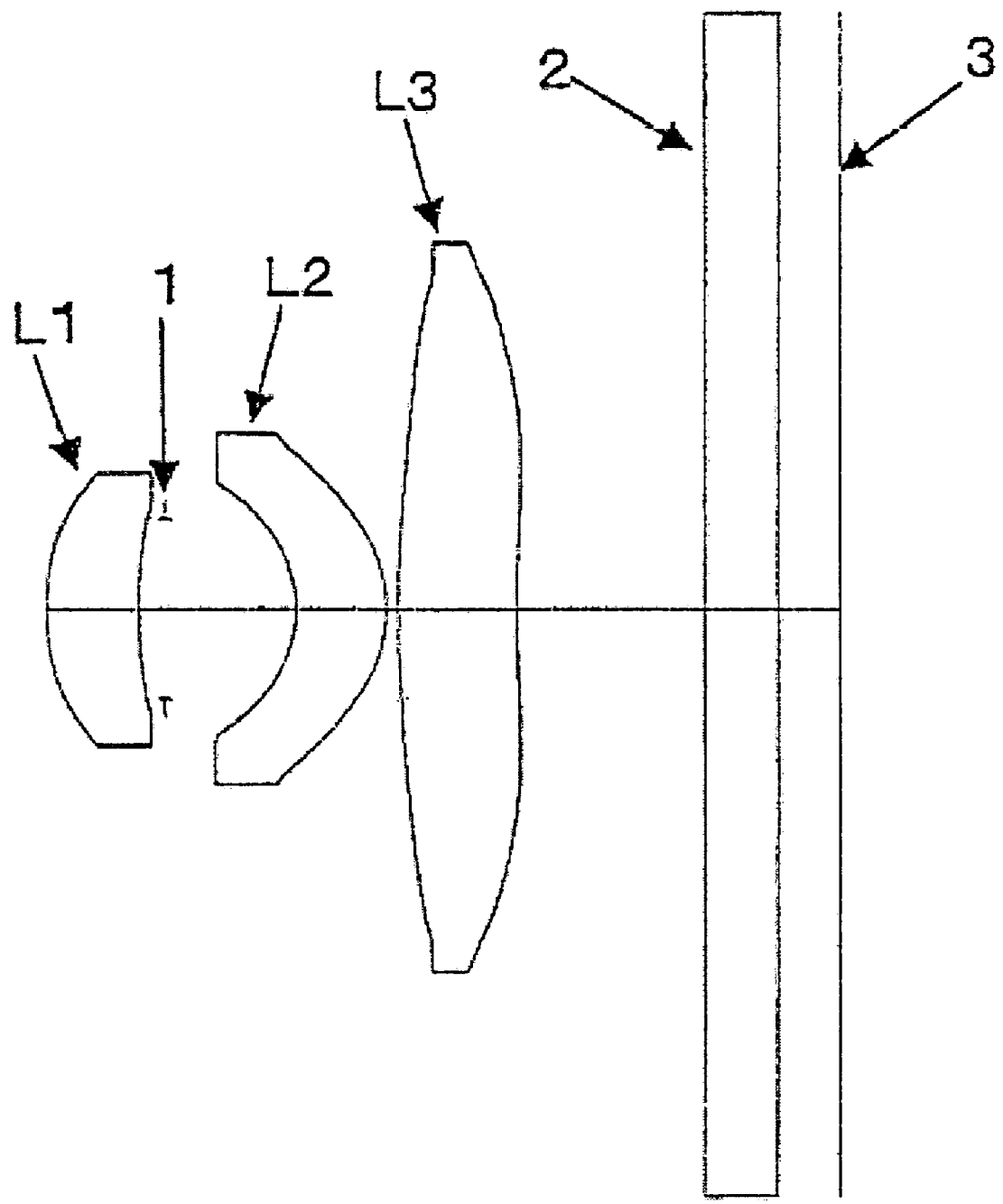
FIG. 7a shows an image lens array in accordance with a seventh embodiment of the present invention.
Figure 7B:
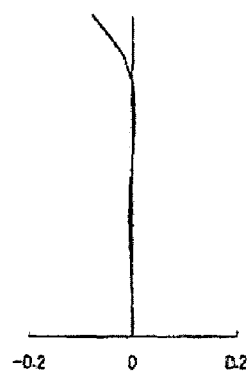
FIG. 7b shows the real numerical values of the respective lens of the seventh embodiment.
Figure 7B:
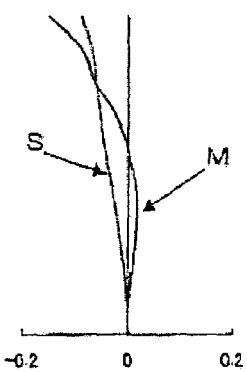
Figure 7B:
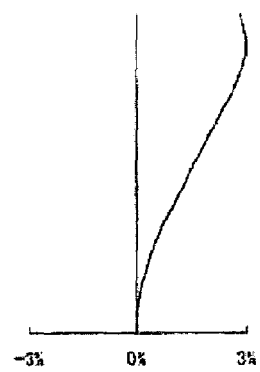

Referring to FIGS. 1–7, which show different image lens arrays in accordance with seven embodiments of the present invention, FIGS. 1a–7a show the configuration of the lens arrays, and FIGS. 1b–7b show the optical characteristic data of the lens arrays. The image-taking lens array in accordance with the present invention is particularly suitable for use as a built-in optical system for a cell phone.

The image lens array, from the object side, comprises a first lens L1, an aperture 1, a second lens L2, a third lens L3, a parallel glass 2 and an image-forming plane 3.

The first lens L1 is a positive meniscus lens with positive refractive power and has a convex surface facing the object side, the second lens L2 is positive meniscus lens with positive refractive power and has a convex surface facing the image side, and the third lens L3 is a positive meniscus lens with positive refractive power and has a convex surface facing the object side. The first and second lenses L1 and L2 form a front group, while the third lens L3 belongs to back group. The parallel glass 2 has infrared filter function, and the image-forming plane 3 is CCD or other device of the like.

The third lens L3 of the back group serves to improve the incident angle, when f3/f>5.0, the overlong focal length f3 of the third lens L3 nearly has no power and is merely used to improve the incident angle. On the image side of the third lens L3 is formed a point of inflexion, defining the scope of the meniscus lens with positive power based on the paraxial shape and power.

The respective lenses are made of the same plastic material and are more competitive in terms of material cost and management cost, as compared with glass lens. Furthermore, the plastic lens can be made into aspherical form, so that a desired optical performance can be achieved simply using three lenses.

The real numerical values of the respective embodiments should be referred to the attached FIGS. 1b–7b, firstly, the meaning of the letters and codes in the respective drawings are explained as follows:

Fno~F

2 ω represents the angle of view f represents the focal length of the imaging lens array The Arabic numbers 1, 2, 3 . . . 9 represent the sequence number of the surfaces of the respective lenses from the object side, (however, 3 represents aperture). For example, the front surface and the rear surface of the first lens L1 are designated by 1 and 2, respectively. 4 and 5 represent both sides of the second lens L2, 6 and 7 represent both sides of the third lens L3, while 8 and 9 represent both sides of the parallel flat glass 2. ∞ represents the radius of curvature (mm). d represents the thickness and its unit is mm. The respective lenses are made of the same material and have the same refractivity and dispersion.

The respective tables also show the spherical aberration, the astigmatic difference and the distortion aberration of the respective embodiments. The data of the d line is shown in each of the drawings, and the astigmatic difference includes the Sagittal (S) plane and the meridional (M) plane.

the aspherical coefficients of the respective lenses are indicated by A, B, C and D, the height of the optical axis is H, and the deflection of the optical axis is X, and then a formula will be satisfied:

$$X=(1/R)H^2/[1+\{1-(1+K)(H/R)^2\}^{1/2}]+AH^4+BH^6+CH^8+DH^{10}$$

The capital R in this formula represents the paraxial radius of curvature, K represents the conical coefficients, the aspherical coefficient E-03 represents $10^{-3}$.

The focal length of the imaging lens array of this invention is f, the combined focal length of the first lens L1 is f1, the focal length of the first lens L1 is f1, the focal length of the first lens L2 is f2, and the present invention can satisfy the following equation:

1) $1.0<f12/f<1.3$ if f12/f≧1.3, the entire optical length will be too long, so that the lens array will accordingly be large. If f12/f≦1.0, the back focal length is too short to provide enough space for accommodation of the infrared filter glass and the image lens protector.

When 1.0<f12/f<1.3, the entire optical length will be shortened enough to make the lens array handy and light but still can provide enough space for accommodation of the infrared filter glass and the image lens protector.

2) $f3/f > 5.0$ (or $0 < f/f3 < 0.2$)

if $f3/f \leq 5.0$, the refracting power of the third lens L3 accounts for an excessively large proportion of the refracting power of the whole image lens array, so that the refracting power of the front group will be weakened, resulting in a overlong optical length of the image lens array. Therefore, the telescope ratio of the third lens to the refracting power of the entire optical system should be relatively low, and a relatively weak refracting power of the third lens is important for incident angle correction. For example, the refracting powers of the object side and image side of the third lens L3 are gradually increased from the center to the periphery of the aspherical surfaces of the third lens L3, and the incident of the light toward the image lens should be small.

3) when $f2/f = \leq 2.0$, it will lead to an excessively strong refracting power of the second lens L2, and the negative refracting power will be shifted, blocking the incident angle. At the same time, the peripheral thickness of the second lens L2 cannot be maintained at desired value. When $f2/f \geq 11.0$, the refracting power of the front group will become weak, resulting in an excessive long optical length of the image lens array.

When the telescope ratio T/f (T represents the distance between the object side (the reference no 1) and the image of the first lens L1) satisfy the equation $1.2 < T/f < 1.4$, it can facilitate the minimization of the image lens array. The attached tables show the comparisons of the cited prior arts relative to the present invention.

The table 1 shows that any equations 1, 2 and 3 can satisfy the telescope ratio as defined in the equation 4, therefore, the image lens array of the present invention can be minimized while enough back focal length can be guaranteed. Furthermore, the lens of the present invention is made of plastic material and is more competitive in price as compared to the conventional glass lens.

In terms of incident angle, the image lens array of the present invention also satisfies the requirement for minimizing the image lens array.

Since it is made of plastic material, the formation of the aspherical surface of the third lens L3 become easy.

The image lens array in accordance with the present invention is very suitable for use as image-taking lens in a cell phone or a digital camera.

While we have shown and described various embodiments in accordance with the present invention, it should be clear to those skilled in the art that further embodiments may be made without departing from the scope of the present invention.

TABLE 1

|  | 1st lens | 2nd lens | 3rd lens | f12/f | f3/f | f2/f | T/f |
|---|---|---|---|---|---|---|---|
| the present invention | plastic | plastic | plastic | 1.0~1.3 | 5~ | 2.0~11.0 | 1.2~1.4 |
| 2004-163851 1st embodiment | glass (FD8) | plastic | plastic | 1.82 | 2.4 | 6.2 | 1.75 |
| 2004-163851 2nd embodiment | glass (FDS90) | plastic | plastic | 1.55 | 2.9 | 6.2 | 1.68 |
| 2004-302058 1st embodiment | glass (FC5) | plastic | plastic | 1.74 | 2.0 | −14.3 | 1.47 |
| 2004-203058 2nd embodiment | glass (TAC6) | plastic | plastic | 1.67 | 2.2 | 119.5 | 1.50 |
| 2004-302059 1st embodiment | glass (FC5) | plastic | plastic | 1.42 | 3.8 | 2.9 | 1.60 |
| 2004-302059 2nd embodiment | glass (TAC6) | plastic | plastic | 1.31 | 5.3 | 2.4 | 1.67 |
| 2004-302060 1st embodiment | glass (BSC7) | plastic | plastic | 1.19 | −37.2 | 2.9 | 1.39 |
| 2004-302060 2nd embodiment | glass (FCD1) | plastic | plastic | 1.19 | −28.5 | 3.3 | 1.37 |
| 1st embodiment of the present invention | plastic | plastic | plastic | 1.24 | 5.6 | 8.72 | 1.30 |
| 2nd embodiment of the present invention | plastic | plastic | plastic | 1.18 | 6.1 | 5.03 | 1.29 |
| 3rd embodiment of the present invention | plastic | plastic | plastic | 1.14 | 37.8 | 2.95 | 1.33 |
| 4th embodiment of the present invention | plastic | plastic | plastic | 1.07 | 88.5 | 2.22 | 1.35 |
| 5th embodiment of the present invention | plastic | plastic | plastic | 1.06 | 181.7 | 2.55 | 1.28 |
| 6th embodiment of the present invention | plastic | plastic | plastic | 1.18 | 6.1 | 5.03 | 1.29 |
| 7th embodiment of the present invention | plastic | plastic | plastic | 1.06 | 78.6 | 2.41 | 1.29 |

TABLE 2

| | | publication No (invention) | material of the lens | T/f | remarks |
|---|---|---|---|---|---|
| | | (A) | | | |
| front aperture | (1) | 2001-75006 | 3P | 1.9 | T/F value is large |
| | (2) | 2004-4566 | 3P | 1.54 | T/F value is large |
| | (3) | 2004-219807 | 3P | 1.8~2.0 | T/F value is large |
| | (4) | 2004-226487 | 3P/3G/2P1G/2G1P | 1.4~1.9 | |
| | (5) | 2004-233536 | 3P | 1.6 | |
| | (6) | 2004-240063 | 3P | 1.6 | |
| | (7) | 2004-251958 | 3P | 1.5 | |
| | (8) | 2004-251959 | 3P/2PIG | 1.6 | |
| | (9) | 2004-252281 | 3P | 1.6 | |
| | (10) | 2004-317743 | 3P | 1.9 | |
| mid aperture | (11) | 2001-83409 | 3P | 2.5 | T/F value is large |
| | (12) | 2004-21982 | 3P | 1.24 | |
| | | (B) | | | |
| front aperture | (1) | 2004-212467 | 1G2P | 1.3~1.43 | |
| | (2) | 2004-226487 | 1G2P/3G/3P | 1.4~1.9 | |

TABLE 2-continued

|  |  | publication No (invention) | material of the lens | T/f | remarks |
|---|---|---|---|---|---|
|  | (3) | 2004-252312 | 3P (same material)/1G2P | 1.4~1.6 |  |
|  | (4) | 2004-309695 | 3P | 1.2 |  |
| mid aperture | (5) | 特許3521332 | 3P (same material) | 1.26 | Not good incident angle |
|  | (6) | 特許3544972 | 3P (same material) | 1.43 | Not good incident angle |
|  | (7) | 2003-322792 | 3P | 1.5 |  |
|  | (8) | 2004-163786 | 2PIG | 2 |  |
|  | (9) | 2004-163849 | 3P (different materials) | 1.9~2.0 |  |
|  | (10) | 2004-163850 | 3P (different materials) | approximately 2.0 |  |
|  | (11) | 2004-240074 | 3P (different materials) | 1.3~1.5 |  |
|  | (12) | 2004-302060 | 1G2P | 1.4~1.6 |  |
|  |  |  | (C) |  |  |
| mid aperture | (1) | 2004-163851 | 1G2P | 1.7程度 |  |
|  | (2) | 2004-302058 | 1G2P | 1.5程度 |  |
|  | (3) | 2004-302059 | 1G2P | 1.6程度 |  |
|  | (4) | 2004-302060 | 1G2P | 1.4程度 |  |
|  |  |  | (D) |  |  |
| front aperture | (1) | 2004-4565 |  |  |  |

What is claimed is:

1. An image lens array, from object side to image side, comprising a first lens, an aperture, a second lens and a third lens; and wherein the first lens is a positive meniscus lens with positive refractive power and has a convex surface facing the object side;

the aperture is located behind the first lens;

the second lens is positive meniscus lens with positive refractive power and has a convex surface facing the image side;

the third lens is a positive meniscus lens with positive refractive power and has a convex surface facing the object side;

and the first lens, the second lens and the third lens are made of the same plastic material, a focal length of the image lens array is f, a combined focal length of the first and second lenses is f12, a relation between the f and f12 can satisfy the equation: $1.0 < f12/f < 1.3$;

the focal length of the image lens array is f, a focal length of the second lens is f2, and then f and f2 can satisfy the equation: $2.0 < f2 < f < 11.0$;

the focal length of the image lens array is f, a focal length of the third lens is f3, and then f and f3 can satisfy the equation: $f3/f > 5.0$.

* * * * *

UNITED STATES PATENT AND TRADEMARK OFFICE
CERTIFICATE OF CORRECTION

PATENT NO.           : 7,085,077 B1
APPLICATION NO.      : 11/247913
DATED                : August 1, 2006
INVENTOR(S)          : Sayuri Noda Page 1 of 1

It is certified that error appears in the above-identified patent and that said Letters Patent is hereby corrected as shown below:

In Column 3, line 10, "$2.0<f2<f<11.0$" should be -- $2.0<f2/f<11.0$ --.

In Column 7, Claim 1, line 21, "$2.0<f2<f<11.0$" should be -- $2.0<f2/f<11.0$ --.

Signed and Sealed this
Tenth Day of January, 2012

David J. Kappos
*Director of the United States Patent and Trademark Office*